(12) United States Patent
Chretien et al.

(10) Patent No.: US 9,800,188 B2
(45) Date of Patent: Oct. 24, 2017

(54) HYBRID DRIVE CIRCUIT FOR VARIABLE SPEED INDUCTION MOTOR

(71) Applicant: Regal Beloit America, Inc., Beloit, WI (US)

(72) Inventors: Ludovic Andre Chretien, Columbia City, IN (US); Roger Carlos Becerra, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 36 days.

(21) Appl. No.: 14/854,757

(22) Filed: Sep. 15, 2015

(65) Prior Publication Data

US 2017/0077857 A1    Mar. 16, 2017

(51) Int. Cl.
| | | |
|---|---|---|
| *H02P 25/00* | (2006.01) |
| *H02P 1/42* | (2006.01) |
| *H02P 23/02* | (2006.01) |
| *H02P 23/00* | (2016.01) |
| *H02P 23/28* | (2016.01) |
| *H02P 27/08* | (2006.01) |

(52) U.S. Cl.
CPC .......... *H02P 23/02* (2013.01); *H02P 23/0086* (2013.01); *H02P 23/28* (2016.02); *H02P 27/08* (2013.01)

(58) Field of Classification Search
CPC ...... H02P 1/44; H02P 5/74; H02P 1/42; H02P 1/445; H02P 27/06; H02P 25/04; H02P 3/14; H02P 3/18; H02P 1/30; H02P 23/20; H02P 25/08; H02P 27/08; H02P 27/16; H02P 6/182; H02P 6/185; H02P 9/00

USPC ................ 318/772, 785, 786, 794, 798, 807
See application file for complete search history.

(56) References Cited

U.S. PATENT DOCUMENTS

| | | | | |
|---|---|---|---|---|
| 3,842,327 A | * | 10/1974 | Wexler ...................... | H02P 1/44 318/786 |
| 4,142,136 A | * | 2/1979 | Witter ....................... | H02P 1/28 318/779 |
| 4,697,131 A | * | 9/1987 | Schauder ............... | H02M 7/529 318/762 |
| 4,720,776 A | * | 1/1988 | Guyeska ............. | H02M 5/4505 363/138 |
| 4,734,634 A | * | 3/1988 | Kito ...................... | H02P 29/025 139/1 E |
| 4,788,635 A | * | 11/1988 | Heinrich ................... | H02P 3/18 318/762 |
| 5,218,283 A | * | 6/1993 | Wills ....................... | H02P 25/04 318/123 |
| 5,359,273 A | * | 10/1994 | Fluckiger ................ | H02P 25/04 318/794 |
| 5,430,636 A | * | 7/1995 | Kachi ..................... | H02M 7/48 363/55 |

(Continued)

*Primary Examiner* — Paul Ip
(74) *Attorney, Agent, or Firm* — Armstrong Teasdale LLP

(57) ABSTRACT

Hybrid motor drive circuits configured to drive a motor are provided herein. A hybrid motor drive circuit includes an inverter coupled to the motor and configured to drive the motor when a motor commanded frequency is not within a predetermined range of line input power frequencies. The hybrid motor drive circuit also includes a first switch device configured to couple line input power to an output of the inverter when the motor commanded frequency is within the predetermined range of line input power frequencies.

19 Claims, 5 Drawing Sheets

(56) References Cited

U.S. PATENT DOCUMENTS

| | | | | |
|---|---|---|---|---|
| 5,714,851 A | * | 2/1998 | Antony | B60L 3/003 318/148 |
| 5,814,898 A | * | 9/1998 | Chen | H02J 9/062 307/66 |
| 5,861,697 A | * | 1/1999 | Sugita | H02K 15/0012 310/151 |
| 5,949,662 A | * | 9/1999 | Boldin | H02J 9/062 307/66 |
| 6,092,993 A | * | 7/2000 | Young | F04B 39/0005 417/221 |
| 6,132,177 A | * | 10/2000 | Loprete | F04B 39/0005 417/221 |
| 6,163,129 A | * | 12/2000 | Younger | H02P 1/26 318/798 |
| 6,169,679 B1 | * | 1/2001 | Deng | H02M 7/493 363/72 |
| 6,172,476 B1 | * | 1/2001 | Tolbert, Jr. | H02P 1/426 318/772 |
| 6,201,371 B1 | * | 3/2001 | Kawabe | H02J 9/062 307/66 |
| 6,389,823 B1 | * | 5/2002 | Loprete | F04B 39/0005 62/180 |
| 6,570,778 B2 | * | 5/2003 | Lipo | H02P 27/048 318/807 |
| 6,591,621 B2 | * | 7/2003 | Loprete | F04B 39/0005 62/160 |
| 6,616,416 B1 | * | 9/2003 | Tolbert, Jr. | B60H 1/3223 318/794 |
| 6,917,124 B2 | * | 7/2005 | Shetler, Jr. | H02J 9/061 307/66 |
| 7,071,650 B2 | * | 7/2006 | Ilda | F04B 35/04 318/781 |
| 7,227,326 B1 | * | 6/2007 | Lu | H02P 6/182 318/461 |
| 7,248,015 B2 | * | 7/2007 | Byrnes, Jr. | H02P 1/44 318/109 |
| 7,298,105 B1 | * | 11/2007 | Lu | H02P 21/0017 318/432 |
| 7,327,588 B2 | * | 2/2008 | Ollila | H02M 7/493 363/71 |
| 7,538,507 B2 | * | 5/2009 | Lu | H02P 6/182 318/461 |
| 7,630,180 B2 | * | 12/2009 | Schmidt | H02H 3/023 318/727 |
| 7,650,760 B2 | | 1/2010 | Nakata et al. | |
| 8,067,920 B2 | * | 11/2011 | Choi | H02P 1/42 318/753 |
| 8,390,237 B2 | * | 3/2013 | Choi | H02K 17/08 318/778 |
| 8,508,166 B2 | | 8/2013 | Marcinkiewicz et al. | |
| 8,716,964 B2 | | 5/2014 | Tanaka et al. | |
| 8,981,686 B2 | | 3/2015 | Becerra et al. | |
| 9,174,525 B2 | * | 11/2015 | Caron | B60L 11/005 |
| 2002/0170301 A1 | * | 11/2002 | Loprete | F04B 39/0005 62/175 |
| 2003/0048006 A1 | * | 3/2003 | Shelter, Jr. | H02J 9/061 307/64 |
| 2005/0179419 A1 | * | 8/2005 | Ollila | H02M 7/493 318/801 |
| 2005/0189889 A1 | * | 9/2005 | Wirtz | H02M 7/003 318/105 |
| 2005/0231151 A1 | * | 10/2005 | Ilda | F04B 35/04 318/785 |
| 2006/0097687 A1 | * | 5/2006 | Byrnes, Jr. | H02P 1/44 318/751 |
| 2007/0013325 A1 | * | 1/2007 | Kiuchi | H02P 5/74 318/34 |
| 2007/0216337 A1 | * | 9/2007 | Lu | H02P 21/0017 318/800 |
| 2007/0247099 A1 | * | 10/2007 | Lu | H02P 6/182 318/461 |
| 2007/0253133 A1 | * | 11/2007 | Schmidt | H02H 3/023 361/104 |
| 2008/0309281 A1 | * | 12/2008 | Choi | H02K 17/08 318/753 |
| 2009/0108796 A1 | * | 4/2009 | Choi | H02P 1/42 318/795 |
| 2009/0159348 A1 | * | 6/2009 | Oyobe | B60L 11/123 180/65.21 |
| 2009/0160393 A1 | * | 6/2009 | Choi | H02P 1/445 318/794 |
| 2010/0052600 A1 | * | 3/2010 | Cecconi | H02P 1/44 318/795 |
| 2010/0145589 A1 | * | 6/2010 | Kobayashi | B60K 6/46 701/93 |
| 2011/0018472 A1 | * | 1/2011 | Rockenfeller | H02P 5/74 318/51 |
| 2011/0018473 A1 | * | 1/2011 | Rockenfeller | B60H 1/00428 318/51 |
| 2011/0018474 A1 | * | 1/2011 | Harhay | H02P 1/30 318/82 |
| 2011/0175557 A1 | * | 7/2011 | Iwashita | H02P 23/06 318/400.3 |
| 2011/0204840 A1 | * | 8/2011 | Mondardo Cnico | H02P 1/445 318/795 |
| 2011/0226559 A1 | * | 9/2011 | Chen | G01R 31/3651 187/290 |
| 2011/0247900 A1 | * | 10/2011 | Blasko | B66B 1/302 187/247 |
| 2011/0296702 A1 | * | 12/2011 | Pillot | D06F 58/206 34/72 |
| 2012/0013372 A1 | * | 1/2012 | Campbell | H03K 5/135 327/141 |
| 2012/0022738 A1 | * | 1/2012 | Kato | B60K 6/365 701/22 |
| 2012/0159984 A1 | * | 6/2012 | Hatipoglu | H02P 1/42 62/498 |
| 2012/0187886 A1 | * | 7/2012 | Mack | H02P 27/06 318/503 |
| 2013/0134910 A1 | * | 5/2013 | Iwashita | H02P 3/14 318/376 |
| 2013/0155746 A1 | * | 6/2013 | Campbell | H02M 7/537 363/131 |
| 2013/0193890 A1 | * | 8/2013 | Kim | H02M 7/44 318/430 |
| 2013/0214708 A1 | * | 8/2013 | Saeki | H02M 5/4585 318/376 |
| 2013/0264991 A1 | * | 10/2013 | de Souza | H02P 1/44 318/785 |
| 2013/0279213 A1 | * | 10/2013 | Saeki | H02M 7/68 363/37 |
| 2013/0279214 A1 | * | 10/2013 | Takase | H02M 7/68 363/37 |
| 2014/0184129 A1 | * | 7/2014 | Oka | H02P 5/74 318/600 |
| 2014/0192929 A1 | * | 7/2014 | Mehta | H04L 7/0338 375/316 |
| 2014/0244082 A1 | * | 8/2014 | Caron | B60L 11/005 701/22 |
| 2015/0188475 A1 | * | 7/2015 | Lee | H02P 27/08 318/500 |
| 2016/0020721 A1 | * | 1/2016 | Ueda | H02P 3/22 318/400.04 |
| 2016/0052383 A1 | * | 2/2016 | Caron | B60L 11/005 180/242 |
| 2016/0118925 A1 | * | 4/2016 | Kim | B60L 7/14 318/139 |
| 2016/0241170 A1 | * | 8/2016 | Oka | H02P 3/18 |
| 2016/0329841 A1 | * | 11/2016 | Tagashira | B25J 9/161 |

\* cited by examiner

US 9,800,188 B2

HYBRID DRIVE CIRCUIT FOR VARIABLE SPEED INDUCTION MOTOR

BACKGROUND OF THE DISCLOSURE

The field of the invention relates generally to electric motors, and more specifically to, hybrid motor drive circuits for variable speed induction motors.

At least some known permanent split capacitor ("PSC") motors are fixed speed motors that are most efficient when operating at line frequency. Such PSC motors have uncontrolled acceleration during startup. Further, at low load conditions, such PSC motors operate at a higher power level than necessary. Alternatively, variable speed motor controllers exist that adapt motor speed to the load level, but are limited by power factor, electromagnetic interference, and electronic loss considerations.

BRIEF DESCRIPTION OF THE DISCLOSURE

In one aspect, a hybrid motor drive circuit configured to drive a motor is provided herein. The hybrid motor drive circuit includes an inverter coupled to the motor and configured to drive the motor when a motor commanded frequency is not within a predetermined range of line input power frequencies. The hybrid motor drive circuit also includes a first switch device configured to couple line input power to an output of the inverter when the motor commanded frequency is within the predetermined range of line input power frequencies.

In another aspect, a hybrid motor drive circuit configured to drive a motor is provided. The hybrid motor drive circuit includes a power converter configured to convert alternating current (AC) line input power to direct current (DC) power, the AC line input power received from a power source at an input terminal. The circuit also includes a DC link electrically coupled to the rectifier, the DC-link comprising a low-capacitance capacitor having a capacitance less than 100 µF. The circuit also includes an inverter coupled downstream from the DC-link and configured to generate a conditioned output power to drive the motor. The circuit also includes a controller configured to operate a switch device configured to bypass a run capacitor of the motor when a motor commanded frequency is not within a predetermined range of line input power frequencies, and synchronize two phases of the inverter to apply an output voltage to the motor that is substantially equivalent to line input voltage when the motor commanded frequency is within the predetermined range of line input power frequencies.

In yet another aspect, a hybrid motor drive circuit configured to drive a motor is provided. The hybrid motor drive circuit includes a bi-directional power converter configured to realize bidirectional power transfer of AC line input power received from a power source and regenerated power from the motor. The circuit also includes an inverter coupled downstream from the bi-directional power converter and configured to generate a conditioned output power to drive the motor. The circuit also includes a controller configured to: synchronize multiple outputs of the inverter by providing two inverter phases with the same command, and enable regeneration of power from the motor to the power source when instantaneous power of the motor becomes negative.

DETAILED DESCRIPTION OF THE DISCLOSURE

Figure 1:
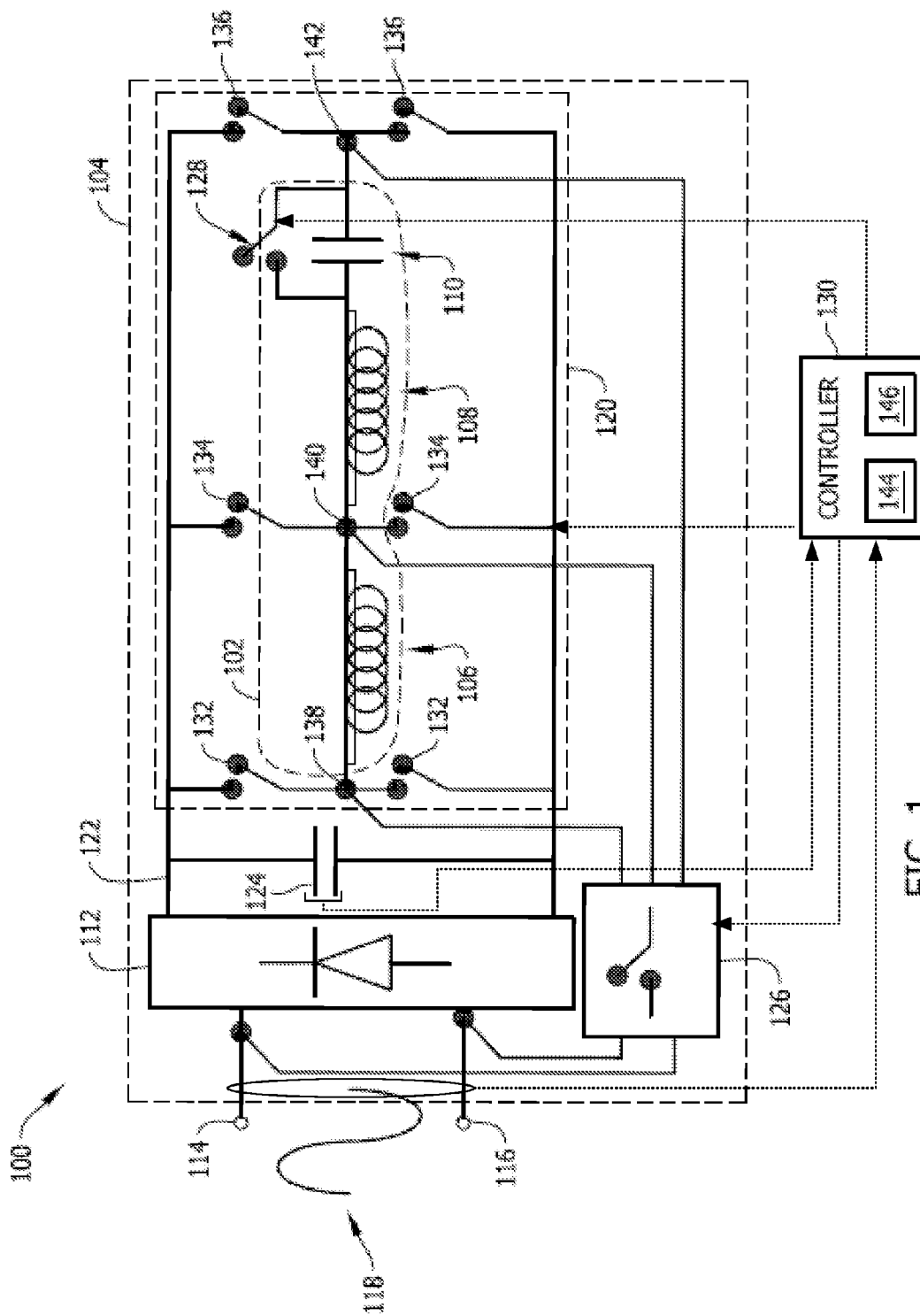
FIG. 1 is a circuit diagram of a hybrid motor system.

FIG. 1 is a block diagram of a hybrid motor system 100. In the exemplary embodiment, hybrid motor system 100 includes a motor 102 and a drive circuit 104 coupled to and configured to control operation of motor 102. In the exemplary embodiment, motor 102 is a permanent split capacitor (PSC) motor that includes a main winding 106, a start winding 108, and a capacitor 110. Drive circuit 104 includes a rectifier 112 configured to receive alternating current (AC) line power input to first and second input terminals 114 and 116 from a power source 118, an inverter 120 coupled downstream from rectifier 112, a direct current (DC) link 122 defined between rectifier 112 and inverter 120, a DC link capacitor 124 coupled across DC link 122, a main switch device 126 configured to selectively couple the AC line power to an output of inverter 120, a bypass switch device 128 configured to selectively bypass capacitor 110, and a controller 130 configured to control operation of drive circuit 104 to drive motor 102.

In the exemplary embodiment, drive circuit 104 receives the AC line input power at first and second input terminals 114 and 116 from an AC power source, such as a utility. Rectifier 112 is configured to rectify the AC line power received at first and second input terminals 114 and 116 to pulsed DC power. DC link capacitor 124 stores the pulsed DC power on DC link 122 and provides a DC link voltage to inverter 120. In the exemplary embodiment, DC link capacitor 124 has a capacitance up to about 1,000 microfarads (g) to substantially maintain the voltage on the DC link to a DC value.

Inverter 120 is a 3-phase inverter and includes first switches 132 associated with a first phase, second switches 134 associated with a second phase, and third switches 136 associated with a third phase of 3-phase inverter 120. In the exemplary embodiment, main winding 106 of motor 102 is coupled to a common node 138 between first switches 132 and to a common node 140 between second switches 134. Moreover, in the exemplary embodiment, start winding 108 of motor 102 is coupled to common node 140 between second switches 134 and to a common node 142 between third switches 136. Capacitor 110 is coupled between start winding 108 and common node 142 between third switches 136. Based on signals received from controller 130, inverter 120 is configured to convert the DC link voltage to a two-phase AC output voltage for driving motor 102 to optimize machine efficiency.

First switch device 126 is coupled to first and second input terminals 114 and 116, and is coupled in parallel to the output of inverter 120. In the exemplary embodiment, first switch device 126 is operated by controller 130 to selectively couple the AC line power to the output of inverter 120 such that the AC line power may be applied directly to main winding 106 and start winding 108. Controller 130 determines whether to open or close first switch device 126 based on an operational frequency of motor 102 or a commanded motor reference point (e.g., a speed setting).

Bypass switch device 128 is coupled in parallel with capacitor 110 of motor 102. More specifically, bypass switch device 128 is coupled between a pole of start winding 108 and common node 138 between third switches 136. However, capacitor position can be reversed as long as the capacitor is in series with the start winding. Bypass switch device 128 is operated by controller 130 to selectively bypass capacitor 110 when motor 102 is operating with the inverter at a frequency different than a frequency band around the line power frequency of power source 118. More specifically, capacitor 110 is provided in motor 102 to generate a phase shift required to start motor 102 in a standard across the line PSC. In the hybrid drive, the starting of the motor can be done through the inverter with the capacitor 110 bypassed.

In the exemplary embodiment, controller 130 includes a processor 144 and a memory device 146. In the exemplary embodiment, controller 130 is implemented in one or more processing devices, such as a microcontroller, a microprocessor, a programmable gate array, a reduced instruction set circuit (RISC), an application specific integrated circuit (ASIC), etc. Accordingly, in this exemplary embodiment, controller 130 is constructed of software and/or firmware embedded in one or more processing devices. In this manner, controller 130 is programmable, such that instructions, intervals, thresholds, and/or ranges, etc. may be programmed for a particular motor 102 and/or an operator of motor 102. Controller 130 may be wholly or partially provided by discrete components, external to one or more processing devices.

In operation, controller 130 is configured to receive a frequency commanded for motor 102 and compare it to a predetermined range of line input power frequencies. Controller 130 is configured to activate or close first switch device 126 when the frequency commanded by motor 102 is within the predefined range of line input power frequencies. Closing first switch device 126 couples first and second input terminals 114 and 116 to the output of inverter 120 such that the line input power is applied directly to main winding 106 and start winding 108 and capacitor 110 of motor 102. As used herein, a "PSC mode" of operation is when line input power is applied directly to motor 102. When operating in PSC mode, motor 102 is operated at a fixed speed based on the line input power.

Additionally or alternatively, controller 130 is configured to open first switch device 126 when the frequency commanded by motor 102 is not within the predefined range of line input power frequencies. Opening first switch device 126 causes inverter 120 to provide conditioned power to motor 102. As used herein, a "drive mode" of operation is when inverter 120 provides conditioned power to motor 102. When operating in drive mode, controller 130 uses pulse width modulation (PWM) to control switches of inverter 120, which enables variable speed control of motor 102.

Hybrid motor system 100 combines the low speed operating points, soft starting, and controlled acceleration benefits of a variable speed drive circuit with the line operable, increased power factor, and reduced electromagnetic interference (EMI) signature benefits of a fixed speed PSC motor to improve overall system operation. More specifically, rather than drive motor 102 at a nominal 60 Hz regardless load demand, hybrid PSC motor system 100 adjusts to lighter loads by reducing the speed of motor 102. Drive circuit 104 is provided to control motor 102 at variable speeds to adapt to changing loads, especially in lower input power ranges where fixed-speed PSC motors are typically less efficient. Further, at higher input power ranges, the drive mode of drive circuit 104 may have a reduced power factor, increased EMI signatures, and/or electronic losses. When the frequency commanded by motor 102 is within the predefined range of line input power frequencies, hybrid motor system 100 switches from drive mode to PSC mode. By switching between drive mode and PSC mode, hybrid PSC motor system 100 provides technical effects including high PF, low EMI, high efficiency, variable speed operation, and control of the starting acceleration. Further, because drive circuit 104 does not have to operate at full power because, at full power, the AC line power is coupled to the output of inverter 120, the size of drive circuit may be reduced.

By using inverter 120 to drive motor 102 in drive mode when the motor commanded frequency is not within the predetermined range of line input power frequencies, drive circuit 104 reduces inrush current, enables soft starting of motor 102, and enables controlled acceleration of motor 102 during startup. More specifically, controller 130 modulates a duty cycle of the switches of inverter 120 to produce motor currents to maximize torque produced by motor 102 during startup. Further, controller 130 is configured to adjust stator frequency of motor 102 to minimize torque pulsation and apply a predetermined acceleration ramp rate. Alternatively, controller 130 is configured to adjust stator frequency by monitoring motor current and adjusting a ramp rate to remain below a predetermined limit.

In one embodiment, hybrid motor system 100 reduces motor capacitor inrush current in bypass switch device 128. Specifically, to reduce motor capacitor inrush current, controller 130 controls timing of bypass switch device 128. More specifically, controller 130 monitors AC line voltage, DC-link voltage, and/or AC line current. Controller 130 operates bypass switch device 128 when the AC line voltage and/or the AC line current are at a minimal value, which limits inrush current in bypass switch device 128. In another embodiment, the voltage and/or current in the bypass switch are monitored or estimated and the controller operates the opening of the bypass switch when the current is minimal to minimize the effect of transient voltage and current during opening that may be damaging to the bypass switch.

In one embodiment, hybrid motor system 100 reduces transient voltages and currents in switch device 126. To reduce transient voltages and currents in switch device 126, controller 130 monitors AC line voltage, DC-link voltage, and/or AC line current. Controller 130 operates switch device 126 when the AC line voltage and/or the AC line current are at a minimal value, which limits inrush current in switch device 126. In some embodiments, controller 130 is configured to monitor motor phase currents to minimize the torque drop when changing mode of operation. In some embodiments, controller 130 is configured to estimate or measure motor terminal voltages to minimize phase difference with AC line voltage and minimize torque pulsation at transition.

In another embodiment, hybrid motor system 100 monitors for a locked rotor condition during both starting and normal operation. Controller 130 compares applied motor voltages and measured motor currents to threshold values. Controller 130 may determine that there is a locked rotor condition when the applied motor voltages and measured motor currents exceed the threshold values.

In some embodiments, hybrid motor system 100 is configured to monitor AC power factor to provide de-rated operation, if necessary. When operating motor 102 using inverter 120, controller 130 is configured to receive motor speed and torque information for motor 102. Based on the motor speed and torque information, controller 130 computes an input power or current limit that drive circuit 104 may draw from power source 118 to avoid exceeding the power ratings of drive circuit 104.

In an alternative embodiment, controller 130 measures a value of AC line current and compares the value of AC line current to a predefined value of AC line current. If the measured AC line current exceeds the predefined value of AC line current, controller 130 provides de-rated operation of system 100 to stay within the limits of the line/breaker capacity.

In some embodiments, hybrid PSC motor system 100 is configured to implement transient motor acceleration and synchronization to reduce transients when switching between modes of operation. In one embodiment, controller 130 is configured to monitor motor phase currents to minimize the torque drop when changing mode of operation. In another embodiment, controller 130 is configured to estimate or measure motor terminal voltages to minimize a phase difference with AC line voltage and minimize torque pulsation at the transition.

Figure 2:
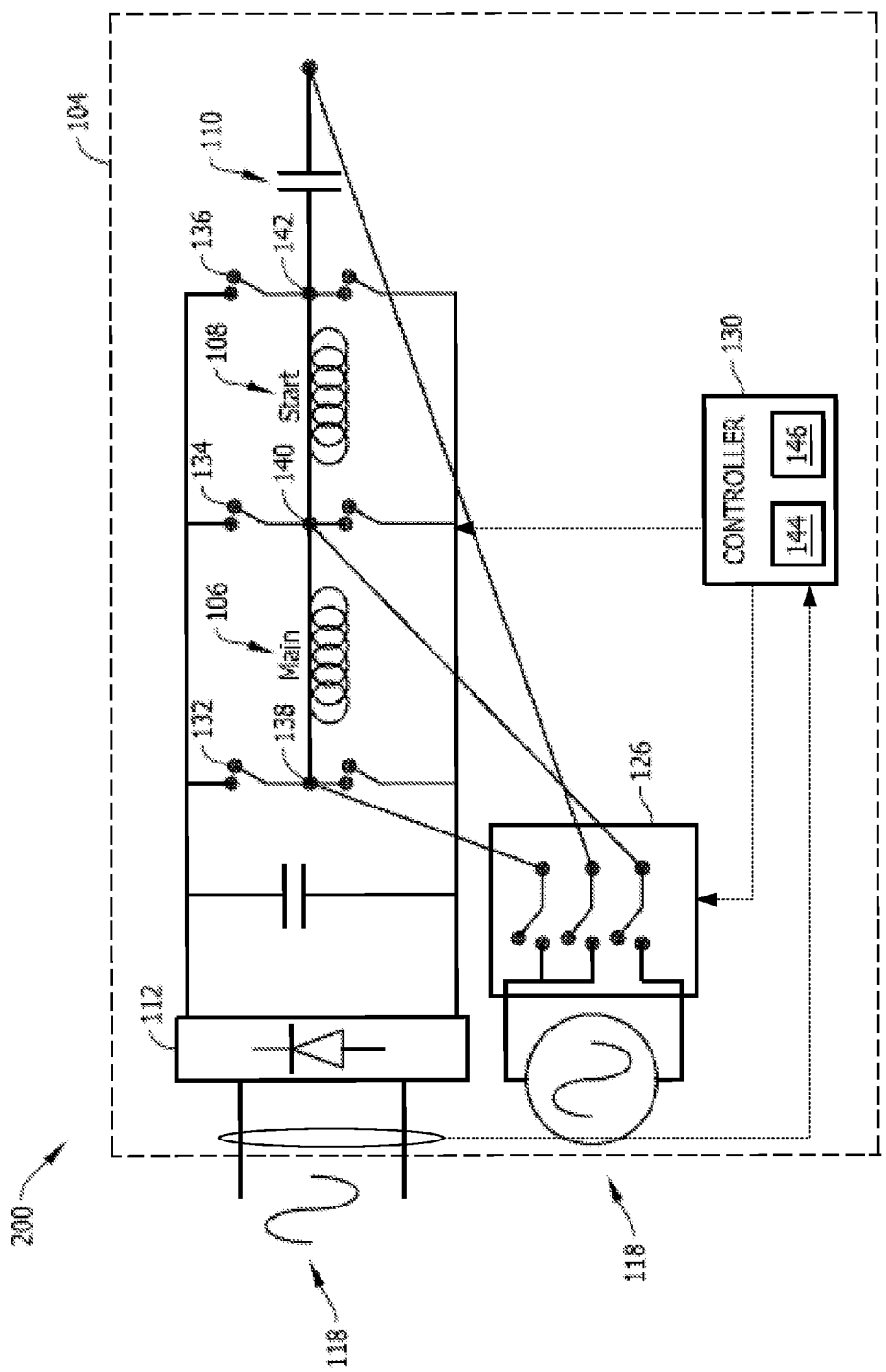
FIG. 2 is a circuit diagram of a hybrid motor system.

FIG. 2 is a block diagram of a hybrid motor system 200. Components of hybrid motor system 200 similar to those described in hybrid motor system 100 (shown in FIG. 1) are referenced in FIG. 2 using the same reference labels used in FIG. 1 and their descriptions are not be repeated herein.

In the exemplary embodiment, hybrid motor system 200 operates in the same manner as hybrid motor system 100, except system 200 does not include bypass switch device 128. Rather, hybrid motor system 200 includes main winding 106 coupled to the first phase output of inverter 120. Moreover, in the exemplary embodiment, start winding 108 includes an input coupled to the second phase output of inverter 120 and an output coupled to a third phase output of inverter 120. Capacitor 110 includes an input coupled to the third phase output of inverter 120 and an output. The positioning of capacitor 110 in hybrid motor system 200 enables operation without bypass switch device 128.

Figure 3A:
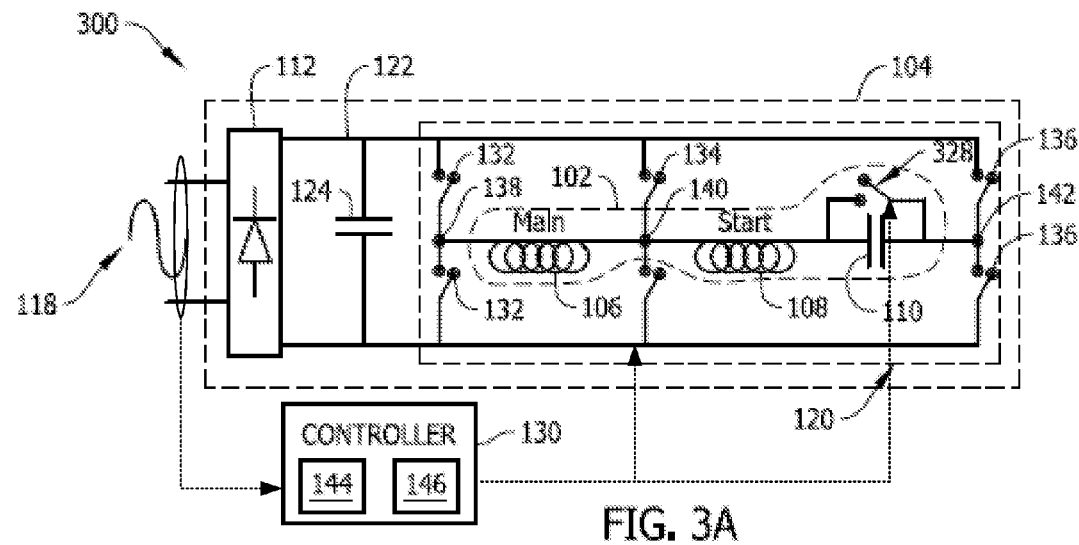
FIG. 3A is a block diagram of a hybrid motor system.
Figure 3B:
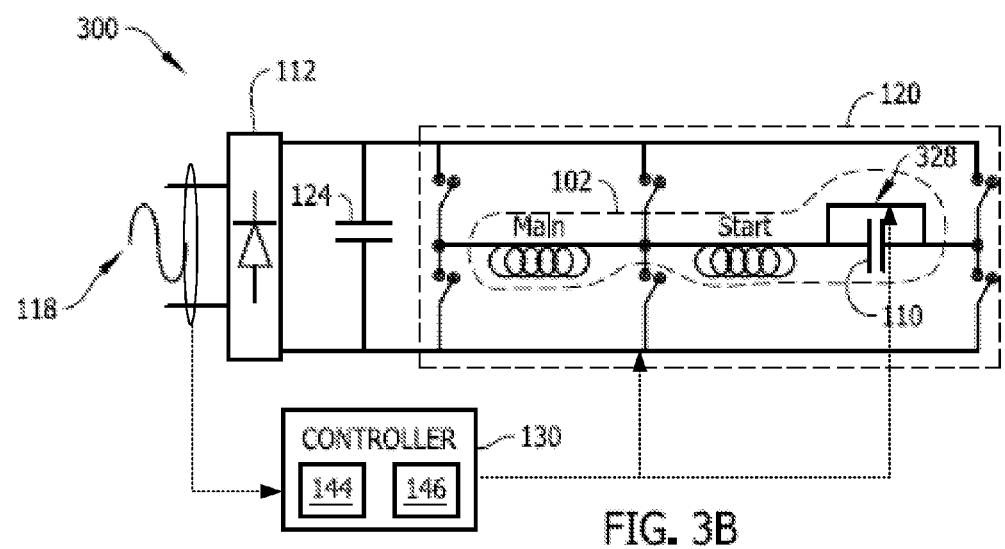
FIG. 3B is a block diagram of the hybrid motor system shown in FIG. 3A in a drive mode.
Figure 3C:
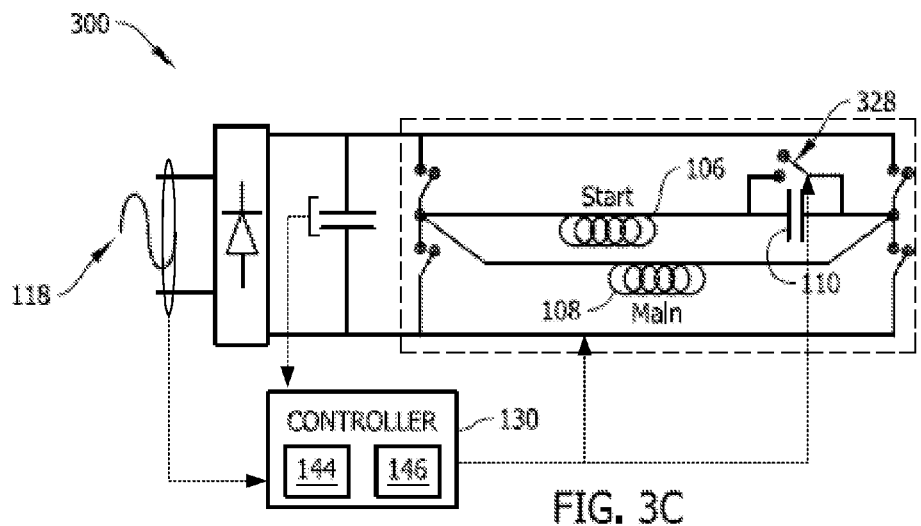
FIG. 3C is a block diagram of the hybrid motor system shown in FIG. 3A in a PSC mode.

FIG. 3A is a block diagram of a hybrid motor system 300. FIG. 3B is a block diagram of hybrid motor system 300 in drive mode. FIG. 3C is a block diagram of hybrid motor system 300 in PSC mode. Components of hybrid PSC motor system 300 similar to those described in hybrid motor system 100 (shown in FIG. 1) are referenced in FIGS. 3A, 3B, and 3C using the same reference labels used in FIG. 1 and their descriptions are not be repeated herein. System 300 differs from system 100 by removing first switching device 126 and using a greatly reduced DC-link capacitance than system 100.

In the exemplary embodiment, hybrid motor system 300 includes motor 102 and drive circuit 104 coupled to and configured to control operation of motor 102. In the exemplary embodiment, motor 102 is a permanent split capacitor (PSC) motor. In the exemplary embodiment, DC link capacitor 124 has a capacitance between about 0.1 $\mu F$ and about 100 $\mu F$.

In the exemplary embodiment, drive circuit 104 receives the AC line input power at first and second input terminals 114 and 116 from an AC power source, such as a utility. Rectifier 112 is configured to rectify the AC line power received at first and second input terminals 114 and 116 to pulsed DC power. DC link capacitor 124 stores a small amount of DC power on DC link 122 and provides a DC link voltage to inverter 120.

In operation, controller 130 is configured to receive a frequency commanded for motor 102 and compare it to a predetermined range of line input power frequencies.

When the frequency commanded for motor 102 is not within the predetermined range of line input power frequencies, drive circuit 104 operates in drive mode to apply variable speed control to operate motor 102, as shown in FIG. 3B. More specifically, in the exemplary embodiment, drive circuit 104 has a low DC link capacitance (i.e., less than 100 $\mu F$) and uses a bypass switch device 328 to bypass capacitor 110. Controller 130 closes bypass switch device 328 to electrically short capacitor 110 and controls 2-phase switching of inverter 120 to achieve the variable speed control.

Because only low capacitance capacitor 124 is used in motor drive circuit 300, large amounts of voltage are not stored on DC link 122 of motor drive circuit 300. Rather, in the exemplary embodiment, drive circuit 300 stores energy on a rotational load, which is coupled to a rotatable shaft (not shown) of motor 102. More specifically, in the exemplary embodiment, the load is a mechanical energy storage device (i.e., a compressor, a condenser fan, or a blower). For example, in one embodiment, the load may be a compressor, a condenser fan, or a blower in an HVAC system.

During operation, in the exemplary embodiment, rectifier 112 rectifies the AC line input voltage received from power source 118 into a pulsed AC. When AC line input voltage is available, controller 130 is configured to increase energy transfer from motor 102 to be stored on the load as inertia. More specifically, when input voltage is available, the torque increases, causing the rotational speed of the load to also increase. In the exemplary embodiment, the inertia of the load limits speed variations of the motor 102, which enables torque production to continue when input voltage is unavailable.

In one embodiment, while input voltage is available, controller 130 also causes small amounts of voltage to be stored on DC-link capacitor 124. When the AC line input voltage approaches zero, capacitor 124 provides the stored voltage to motor 102.

As the input voltage begins to drop, torque produced on the load by motor 102 turns into rotational speed. As AC line input voltage approaches zero or DC link voltage has approximately 100% voltage ripple, controller 130 mitigates a reduction in energy transfer from the load to motor 102 to produce positive torque. More specifically, controller 130 controls current flowing to motor 102 such that motor 102 continues producing torque when input voltage to motor 102 approaches zero or equals zero. In an alternative embodiment, controller 130 also manages energy transfer from capacitor 124 to motor 102. These energy transfers enable motor 102 to operate while input voltage is low or unavailable during each phase of the pulsed DC voltage.

As shown in FIG. 3C, when the frequency commanded by motor 102 is within the predetermined range of line input power frequencies, controller 130 is configured to synchronize an output of motor drive circuit 104 to operate motor 102 at a full load with a frequency that is about two times greater than a line input frequency. Specifically, controller 130 synchronizes the first and third phases of inverter 120 to apply an output voltage that is substantially equivalent to line input voltage.

Hybrid motor system 300 achieves similar benefits to hybrid PSC motor system 100 without using switching device 126 (shown in FIG. 1) to couple the AC line power to an output of inverter 120. Rather, hybrid motor system 300 uses a small DC link capacitance with switching device 136 to bypass capacitor 110 in drive mode when the frequency commanded by motor 102 is not within the predefined range of line input power frequencies. When the frequency commanded by motor 102 is within the predefined range of line input power frequencies, hybrid motor system 300 implements a control method to synchronize electronic drive output to operate at twice the frequency of the utility using a PSC motor designed for a full load. Hybrid motor system 300 provides technical effects including high PF, low EMI, high efficiency, variable speed operation, and control of the starting acceleration. Further, because drive circuit 104 does not have to operate at full power because, at full power, the AC line power is coupled to the output of inverter 120, the size of drive circuit may be reduced.

In one embodiment, hybrid motor system 300 controls drive circuit 104 output state to limit power regeneration on DC-link capacitor 124. Drive circuit 104 uses low-capacitance DC-link capacitor 124 to maximize a conduction interval of the power converter and maximize power factor. Controller 130 measures the DC-link voltage, current of inverter 120, or an instantaneous power of motor 102. Controller 130 modifies a voltage commanded to inverter 120 to minimize a flow of current from motor 102 to DC-link capacitor 124.

In one embodiment, hybrid motor system 300 controls drive circuit 104 output state to synchronize multiple outputs of inverter 120 by providing two inverter phases with the same command. Controller 130 then switches inverter phases to apply either a positive voltage or negative voltage to motor 102, depending on a polarity of the line input voltage. Controller 130 commutates inverter 120 at low frequency within a frequency band of about twice the frequency of power source 118.

By using inverter 120 to drive motor 102 in drive mode when the motor commanded frequency is not within the predetermined range of line input power frequencies, drive circuit 104 reduces inrush current, enables soft starting of motor 102, and enables controlled acceleration of motor 102 during startup. More specifically, controller 130 modulates a duty cycle of the switches of inverter 120 to produce motor currents to maximize torque produced by motor 102 during startup. Further, controller 130 is configured to adjust stator frequency of motor 102 to minimize torque pulsation and apply a predetermined acceleration ramp rate. Alternatively, controller 130 is configured to adjust stator frequency by monitoring motor current and adjusting a ramp rate to remain below a predetermined limit.

In one embodiment, hybrid motor system 300 reduces motor capacitor 110 inrush current in bypass switch device 328. Specifically, to reduce motor capacitor 110 inrush current, controller 130 controls timing of bypass switch device 328. More specifically, controller 130 monitors AC line voltage, DC-link voltage, and/or AC line current. Controller 130 operates bypass switch device 328 when the AC line voltage and/or the AC line current are at a minimal value, which limits inrush current in bypass switch device 328.

In another embodiment, hybrid motor system 300 monitors for a locked rotor condition during both starting and normal operation. Controller 130 compares applied motor voltages and measured motor currents to threshold values. Controller 130 may determine that there is a locked rotor condition when the applied motor voltages and measured motor currents exceed the threshold values.

In some embodiments, hybrid motor system 300 is configured to monitor AC power factor to provide de-rated operation, if necessary. When operating motor 102 using inverter 120, controller 130 is configured to receive motor speed and torque information for motor 102. Based on the motor speed and torque information, controller 130 computes an input power or current limit that drive circuit 104 may draw from power source 118 to avoid exceeding the power ratings of drive circuit 104.

In an alternative embodiment, controller 130 measures a value of AC line current and compares the value of AC line current to a predefined value of AC line current. If the measured AC line current exceeds the predefined value of AC line current, controller 130 provides de-rated operation of system 100 to stay within the limits of the line/breaker capacity.

In some embodiments, hybrid motor system 300 is configured to implement transient motor acceleration and synchronization to reduce transients when switching between modes of operation. In one embodiment, controller 130 is configured to monitor motor phase currents to minimize the torque drop when changing mode of operation. In another embodiment, controller 130 is configured to estimate or measure motor terminal voltages to minimize a phase difference with AC line voltage and minimize torque pulsation at the transition.

Figure 4:
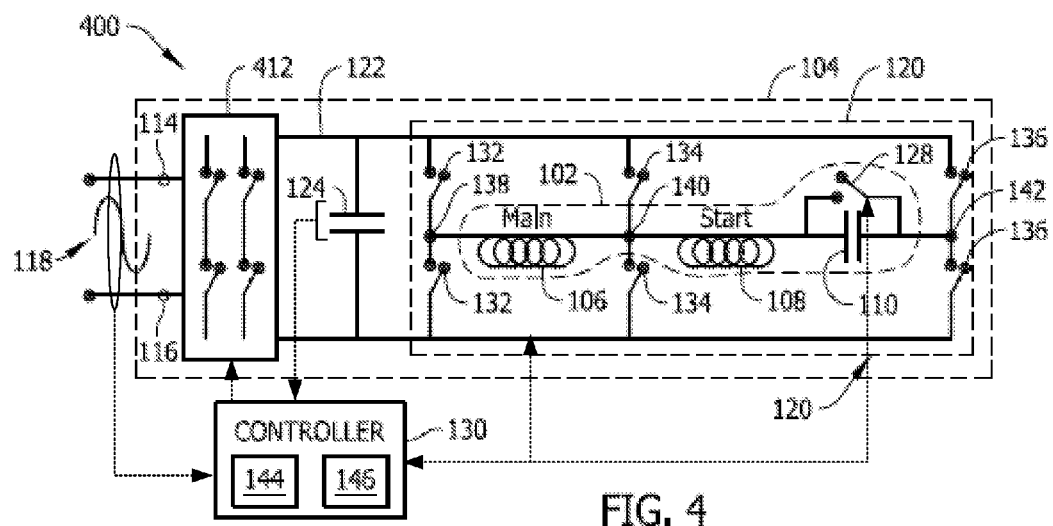
FIG. 4 is a circuit diagram of a hybrid motor system.

FIG. 4 is a block diagram of a hybrid motor system 400. Components of hybrid motor system 400 similar to those described in PSC motor system 100 (shown in FIG. 1) are referenced in FIG. 4 using the same reference labels used in FIG. 1 and their descriptions are not be repeated herein. System 400 differs from system 100 by removing first switching device 126, using a much lower DC link capacitance as compared to system 100, and using a bi-directional front-end power converter to realize bi-directional power transfer between a utility and motor 102.

In the exemplary embodiment, hybrid motor system 400 includes motor 102 and drive circuit 104 coupled to and configured to control operation of motor 102. Motor 102 includes main winding 106, start winding 108, and capacitor 110. In the exemplary embodiment, motor 102 is a permanent split capacitor (PSC) motor. Drive circuit 104 includes a bi-directional front-end power converter 412 configured to receive AC line power input to first and second input terminals 114 and 116 from power source 118, inverter 120 coupled downstream from rectifier 112, a DC link 122 defined between bi-directional front-end power converter 412 and inverter 120, and DC link capacitor 124 coupled across DC link 122. In the exemplary embodiment, DC link capacitor 124 has a capacitance between about 0.1 µF and about 100 µF.

In the exemplary embodiment, drive circuit 104 receives the AC line input power at first and second input terminals 114 and 116 from an AC power source, such as a utility. Bi-directional front-end power converter 412 is configured to convert the AC line power received at first and second input terminals 114 and 116 to pulsed DC power. Additionally, when power is regenerated from motor 102, bi-directional front-end power converter 412 is configured to provide the regenerated power back to power source 118.

Inverter 120 is a 3-phase inverter and includes first switches 132 associated with a first phase, second switches 134 associated with a second phase, and third switches 136 associated with a third phase of 3-phase inverter 120. In the exemplary embodiment, main winding 106 of motor 102 is coupled to a common node 138 between first switches 132 and to a common node 140 between second switches 134. Moreover, in the exemplary embodiment, start winding 108 of motor 102 is coupled to common node 140 between second switches 134 and to a common node 142 between third switches 136. Capacitor 110 is coupled between start winding 108 and common node 142 between third switches 136. Based on signals received from controller 130, inverter 120 is configured to convert the DC link voltage to a single-phase AC output voltage for driving motor 102.

Bypass switch device 128 is coupled in parallel with capacitor 110 of motor 102. More specifically, bypass switch device 128 is coupled between a side of start winding 108 and common node 138 between third switches 136. Bypass switch device 128 is operated by controller 130 to selectively bypass capacitor 110 when motor 102 is not operating at a line power frequency of power source 118.

In one embodiment, hybrid motor system 400 controls drive circuit 104 output state to limit power regeneration on DC-link capacitor 124. Drive circuit 104 uses low-capacitance DC-link capacitor 124 to maximize a conduction interval of the power converter and maximize power factor. Controller 130 measures the DC-link voltage, current of inverter 120, or an instantaneous power of motor 102. Controller 130 modifies a voltage commanded to inverter 120 to minimize a flow of current from motor 102 to DC-link capacitor 124.

In one embodiment, hybrid motor system 400 controls drive circuit 104 output state to synchronize multiple outputs of inverter 120 by providing two inverter phases with the same command. Controller 130 then switches inverter phases to apply either a positive voltage or negative voltage to motor 102, depending on a polarity of the line input voltage. Controller 130 commutates inverter 120 at low frequency within a frequency band of about twice the frequency of power source 118.

In one embodiment, hybrid motor system 400 controls bi-directional front-end power converter 412 to enable regeneration when instantaneous power of motor 102 becomes negative. Controller 130 is configured to measure the DC-link voltage and determine whether the DC-link voltage is higher than AC line voltage. Alternatively, controller 130 may measure instantaneous power of motor 102 or current of inverter 120. Controller 130 then assesses whether instantaneous power is negative. If the instantaneous power is negative, controller 130 commands bi-directional front-end power converter 412 to couple drive circuit 104 across the line input power to enable the current to flow back to power source 118.

By using inverter 120 to drive motor 102 in drive mode when the motor commanded frequency is not within the predetermined range of line input power frequencies, drive circuit 104 reduces inrush current, enables soft starting of motor 102, and enables controlled acceleration of motor 102 during startup. More specifically, controller 130 modulates a duty cycle of the switches of inverter 120 to produce motor currents to maximize torque produced by motor 102 during startup. Further, controller 130 is configured to adjust stator frequency of motor 102 to minimize torque pulsation and apply a predetermined acceleration ramp rate. Alternatively, controller 130 is configured to adjust stator frequency by monitoring motor current and adjusting a ramp rate to remain below a predetermined limit.

In one embodiment, hybrid motor system 400 reduces motor capacitor 110 inrush current in bypass switch device 128. Specifically, to reduce motor capacitor 110 inrush current, controller 130 controls timing of bypass switch device 128. More specifically, controller 130 monitors AC line voltage, DC-link voltage, and/or AC line current. Controller 130 operates bypass switch device 128 when the AC line voltage and/or the AC line current are at a minimal value, which limits inrush current in bypass switch device 128. In another embodiment, the voltage and/or current in the bypass switch are monitored or estimated and the controller operates the opening of the bypass switch when the current is minimal to minimize the effect of transient voltage and current during opening that may be damaging to the bypass switch.

In another embodiment, hybrid motor system 400 monitors for a locked rotor condition during both starting and normal operation. Controller 130 compares applied motor voltages and measured motor currents to threshold values. Controller 130 may determine that there is a locked rotor condition when the applied motor voltages and measured motor currents exceed the threshold values.

In some embodiments, hybrid motor system 400 is configured to monitor AC power factor to provide de-rated operation, if necessary. When operating motor 102 using inverter 120, controller 130 is configured to receive motor speed and torque information for motor 102. Based on the motor speed and torque information, controller 130 computes an input power or current limit that drive circuit 104 may draw from power source 118 to avoid exceeding the power ratings of drive circuit 104.

In an alternative embodiment, controller 130 measures a value of AC line current and compares the value of AC line current to a predefined value of AC line current. If the measured AC line current exceeds the predefined value of AC line current, controller 130 provides de-rated operation of system 100 to stay within the limits of the line/breaker capacity.

In some embodiments, hybrid motor system 400 is configured to implement transient motor acceleration and synchronization to reduce transients when switching between modes of operation. In one embodiment, controller 130 is configured to monitor motor phase currents to minimize the torque drop when changing mode of operation. In another embodiment, controller 130 is configured to estimate or measure motor terminal voltages to minimize a phase difference with AC line voltage and minimize torque pulsation at the transition.

Figure 5:
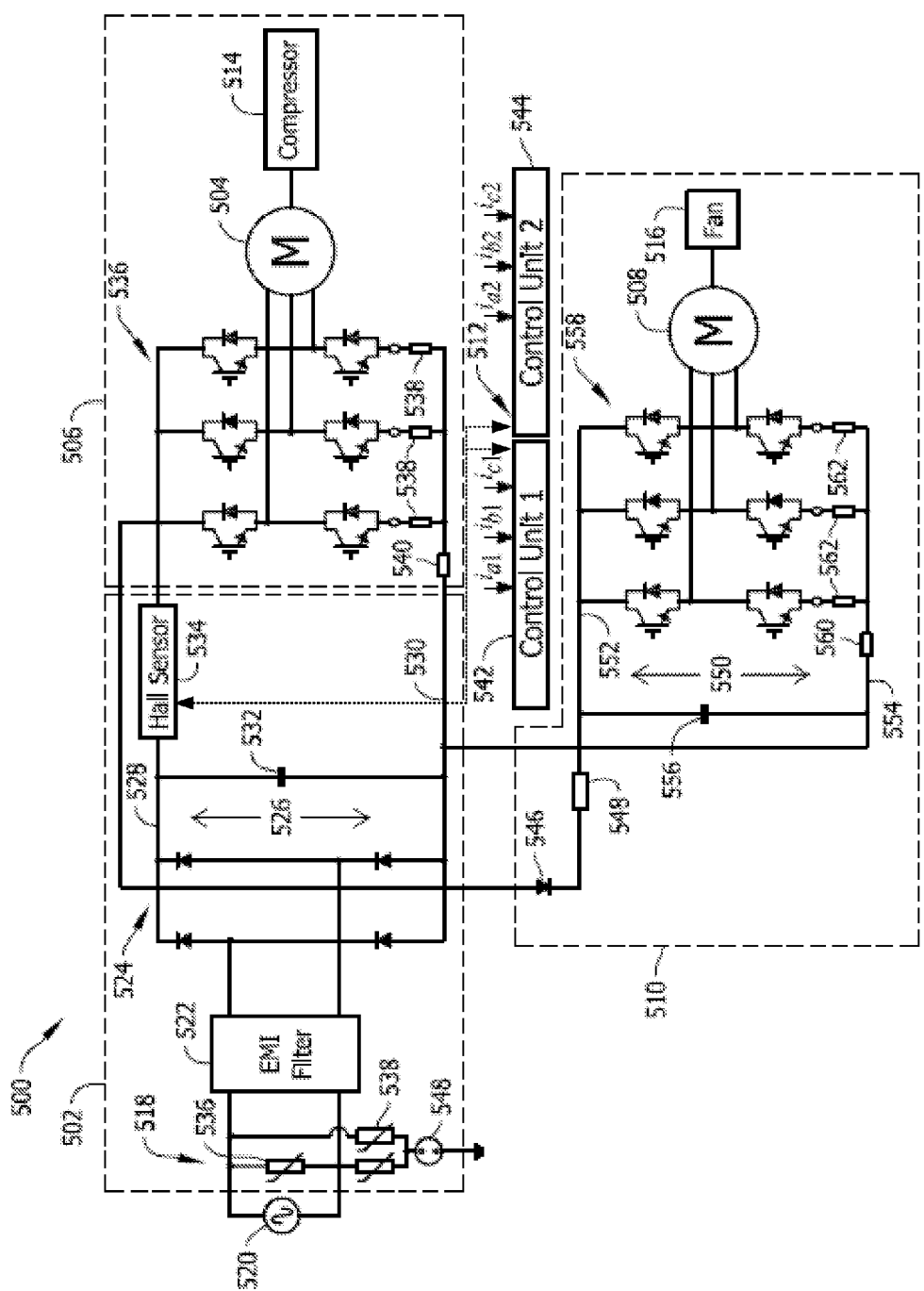
FIG. 5 is a circuit diagram of a hybrid twin motor system.

FIG. 5 is a circuit diagram of an exemplary hybrid twin motor system 500 that may use any of hybrid motor systems 100, 200, 300, 400 (shown in FIGS. 1-4). In the exemplary embodiment, hybrid twin motor system 400 includes a common motor drive circuit 502 that combines common components of a compressor motor drive circuit and a condenser motor drive circuit. More specifically, in the exemplary embodiment, hybrid twin motor system 500 includes common motor drive circuit 502, a first electric motor 504 having a first motor drive circuit 506, a second electric motor 508 having a second motor drive circuit 510 and a motor controller 512. System 500 is referred to as a hybrid system because it may use either a low-capacitance capacitor (between about 0.1 µF and about 100 µF) or a large DC capacitor (over 1000 µF) in first motor drive circuit 506 and a high-capacitance capacitor (between about 200 µF and 1000 µF) in second motor drive circuit 510.

In the exemplary embodiment, and as described herein, first electric motor 504 is a compressor motor 504 for a compressor 514, first motor drive circuit 506 is a compressor motor drive circuit 506, second electric motor 508 is a condenser fan motor 508 for a condenser fan 516, and second motor drive circuit 510 is a condenser fan motor drive circuit 510. In the exemplary embodiment, compressor motor drive circuit 506 is loaded by compressor motor 504, which has a power capability between about 1.5 HP-7.5 HP, and condenser fan motor drive circuit 510 is loaded by a condenser fan motor 508, which has a power capability of about ⅓ HP.

In the exemplary embodiment, common motor drive circuit 502 includes a surge protection device 518 configured to be coupled to a power supply 520, an electromagnetic interference (EMI) filter 522, a rectifier 524, a first DC-link 526 defined by a positive DC-link rail 528 and a negative DC-link rail 530, a low-capacitance capacitor 532 coupled across first DC link 526, and a hall sensor 534 coupled to positive DC-link rail 528.

Surge protection device 518 includes a line-to-line metal oxide varistor (MOV) 536, a line-to-ground MOV 538, and a gas discharge tube (GDT) 540. Surge protection device 518 is configured to provide lightning protection for hybrid twin motor system 500 when there is a surge in voltage from power supply 520. In the exemplary embodiment, power supply 520 is a single phase alternating current power source, such as an electrical grid or utility, that supplies a sine wave input voltage. EMI filter 522 is configured to prevent EMI noise from coupling back to power supply 520. The signals output from EMI filter 522 are applied to rectifier 524, which transforms the sine wave input voltage to a rectified AC voltage.

Low-capacitance capacitor 532 is configured to store small amounts of energy when input voltage is available. In the exemplary embodiment, low-capacitance capacitor 532 is a film capacitor and has a capacitance between about 0.1 µF and about 100 µF. The use of bulky, unreliable electrolytic filter capacitors in common motor drive circuit 502 is avoided. Low-capacitance capacitor 532 is used as the energy storage component for compressor motor 504. Further, low-capacitance capacitor 532 facilitates increasing a power factor of hybrid twin motor system 500 to at least about 0.9.

Hall sensor 534 is coupled to positive DC-link rail 528 after low-capacitance capacitor 532 and is configured to provide ground fault protection when large current flows through positive DC-link rail 528. In the exemplary embodiment, current is considered a large current when it is larger than a normal operating current of the particular electric motor and may be higher than 100 Amps in a typical 240 V AC-line system. In one embodiment, a ground fault occurs when current supplied from a power supply goes directly to earth ground and does not return to the normal power lines due to damage of motor insulation, which creates large short circuit current and may damage semiconductor devices in the system. Hall sensor 534 senses current on positive DC-link rail 528 and outputs a fault signal to motor controller 512, and receives a reset signal from motor controller 512.

In the exemplary embodiment, compressor motor drive circuit 506 is coupled to first DC-link 526 downstream from hall sensor 534. Compressor motor drive circuit 506 includes an inverter 536 configured to be coupled to compressor motor 504. In the exemplary embodiment, inverter 536 is a three-phase DC-AC voltage source inverter. Inverter 536 is configured to receive control signals from motor controller 512 and supply compressor motor 504 with conditioned AC voltage accordingly.

In the exemplary embodiment, inverter 536 is a three-phase inverter and includes a set of inverter switches for each of the three phases. Inverter 536 also includes first, second, and third shunt resistors 538 coupled to respective sets of inverter switches and to said negative DC-link rail 530. In another embodiment, inverter 536 includes one shunt resistor 540 coupled to negative DC-link rail 530. In either case, shunt resistors 538 or shunt resistor 540 are configured to sense current on negative DC-link rail 530 to provide ground fault current protection for negative DC-link rail 530.

In the exemplary embodiment, motor controller 512 is programmed to control operation of both compressor motor 504 and condenser fan motor 508 of hybrid twin motor system 500. More specifically, motor controller 512 includes a first control unit 542 operable to perform current control and pulse-width modulated (PWM) signal generation for compressor motor 504 and a second control unit 544 operable to perform current control and pulse-width modulated signal generation for condenser fan motor 508.

First control unit 542 is configured to implement DPT control of power supplied to drive compressor 514. More specifically, first control unit 542 is configured to increase energy transfer from compressor motor 504 to compressor 514 when input voltage is available and to mitigate a reduction in energy transfer from compressor 514 to compressor motor 504 to produce positive torque when DC-link voltage has approximately 100% voltage ripple. To control compressor 514, first control unit 542 is configured to generate PWM signals that are applied to inverter 536 to control rotation of compressor motor 504. Additionally, first control unit 542 is configured to receive the fault signal from hall sensor 534 and processed shunt currents from shunt resistors 538, and in response to a ground fault, disables any PWM signals to inverter 536 to remove power to compressor motor 504 during a fault.

In the exemplary embodiment, second or condenser fan motor drive circuit 510 includes a diode 546, a negative temperature coefficient (NTC) resistor 548, a second DC-link 550 defined by a second positive DC-link rail 552 and a second negative DC-link rail 554, a high-capacitance capacitor 556 coupled across second DC link 550, an inverter 558, and one or three shunt resistors 560 or 562.

Diode 546 and NTC resistor 548 are coupled between low-capacitance capacitor 532 and high-capacitance capacitor 556. More specifically, diode 546 and NTC resistor 548 are coupled after hall sensor 534 so that hall sensor 534 may also provide ground fault protection for condenser fan motor 508. In the exemplary embodiment, diode 546 and NTC resistor 548 are configured to provide inrush current protection for condenser fan motor drive circuit 510 that may be caused by the presence of high-capacitance capacitor 556.

In the exemplary embodiment, high-capacitance capacitor 556 has a capacitance between about 200 µF and 1000 µF. High-capacitance capacitor 556 receives the rectified AC voltage generated by rectifier 524 and generate a smoothed DC voltage which is applied to inverter 558.

Inverter 558 is configured to be coupled to condenser fan motor 508. In the exemplary embodiment, inverter 558 is a three-phase DC-AC voltage source inverter. Inverter 558 is configured to receive control signals from motor controller 512 and supply condenser fan motor 508 with conditioned AC voltage accordingly.

In the exemplary embodiment, inverter 558 is a three-phase inverter and includes a set of inverter switches for each of the three phases. Inverter 558 also includes first, second, and third shunt resistors 562 coupled to respective sets of inverter switches and to negative DC-link rail 554. In another embodiment, inverter 558 includes one shunt resistor 564 coupled to negative DC-link rail 554. In either case, shunt resistors 562 or shunt resistor 564 are configured to sense current on negative DC-link rail 554 to provide ground fault current protection for negative DC-link rail 554.

In the exemplary embodiment, second control unit 544 is configured to generate PWM signals that are applied to inverter 558 to control rotation of condenser fan motor 508 using energy stored on high-capacitance capacitor 556. Additionally, second control unit 544 is configured to receive the fault signal from hall sensor 534 and processed shunt currents from shunt resistors 562, and in response to a ground fault, disables any PWM signals to inverter 558 to remove power to condenser fan motor 508 during a fault.

In some embodiments, hybrid motor system 500 additionally includes one or more blower motors and one or more associated blower motor drive circuits. In such implementations, system 500 is a hybrid triple or "trio" motor system. Each of the one or more blower motor drive circuits include similar components and operate similarly to condenser fan motor drive circuit 510. In such embodiments, a single drive circuit would control operation of compressor 514, condenser fan 516, and the one or more blowers.

In another embodiment, any of hybrid motor systems 100, 200, 300, 400 may be used in an air conditioning system that includes a heat pumpadding heating capability to the typical cooling system, a reversing valve that directs a flow of coolant between indoor and outdoor coils, and an expansion valve. In the exemplary embodiment, the PSC motor may be one of hybrid motor systems 100, 200, 300, 400. When using the heat pump, a reversing valve is used for directional changes only. In both heat pump and cooling modes, an expansion valve is used to relieve pressure. Hybrid motor systems 100, 200, 300, 400 may be configured to control the compressor PSC motor and integrate control of the reversing and/or expansion valve on a single board electronic control.

In addition to compressors, blowers, and fans, some implementations of the hybrid motor systems 100, 200, 300, 400 operate one or more pump motors. In some implementations, the hybrid motor system (e.g., hybrid motor system 100, 200, 300, or 400) operates the motor below line frequency or above line frequency for overspeed, if needed.

A technical effect of the methods and systems described herein may include one or more of: (a) increasing power factor; (b) reducing EMI; (c) increasing efficiency; (d) enabling variable speed operation of a fixed speed PSC motor; and (e) enabling control of the starting acceleration of a fixed speed PSC motor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A motor drive circuit configured to drive a motor, said motor drive circuit comprising:
   a three-phase inverter coupled to the motor and configured to generate a two-phase AC output voltage to drive the motor when a motor commanded frequency is not within a predetermined range of line input power frequencies, said three-phase inverter comprising:
      a first phase output coupled to a main winding of the motor;
      a second phase output coupled to the main winding and a start winding of the motor; and
      a third phase output coupled to a capacitor that is coupled to the start winding; and
   a first switch device configured to couple line input power to an output of the inverter to drive the motor using the line input power when the motor commanded frequency is within the predetermined range of line input power frequencies.

2. The motor drive circuit of claim 1, further comprising a power converter configured to convert alternating current (AC) line input power to direct current (DC) power, the AC line input power received from a power source at an input terminal.

3. The motor drive circuit of claim 1, wherein:
   said first phase output is coupled to a first side of the main winding;
   said second phase output is coupled to a second side of the main winding and a first side of the start winding; and
   said third phase output is coupled to the capacitor that is series-coupled to a second side of the start winding.

4. The motor drive circuit of claim 3, further comprising a second switch device configured to enable the capacitor of the motor when the first switch device couples the line input power to the output of the three-phase inverter.

5. The motor drive circuit of claim 1, further comprising:
   the start winding comprising an input coupled to the second phase output of the three-phase inverter and an output coupled to a third phase output of the three-phase inverter; and
   the capacitor comprising an input coupled to the third phase output of the three-phase inverter and an output.

6. The motor drive circuit of claim 1, further comprising a controller configured to control operation of the first switch device.

7. The motor drive circuit of claim 1, further configured to drive at least one of a compressor, a condenser fan, and an indoor blower motor.

8. The motor drive circuit of claim 1, further configured to drive a compressor motor and at least one of a reversing valve and an expansion valve in a cooling and heat pump application.

9. The motor drive circuit of claim 1, further configured to use a drive circuit to increase efficiency when the motor commanded frequency is not within the predetermined range of line input power frequencies.

10. The motor drive circuit of claim 1, further configured to operate directly from the line input power to eliminate or mitigate electronic drive losses and increase efficiency over at least a portion of the operating range of the motor.

11. The motor drive circuit of claim 1, wherein the motor is a permanent split capacitor motor.

12. The motor drive circuit of claim 1, wherein the motor is a first motor, said motor drive circuit is further configured to operate at least one of a second motor and a third motor.

13. A motor drive circuit configured to drive a motor, said motor drive circuit comprising:
   a power converter configured to convert alternating current (AC) line input power to direct current (DC) power, the AC line input power received from a power source at an input terminal;
   a DC link electrically coupled to the rectifier, the DC-link comprising a low-capacitance capacitor having a capacitance less than 100 μF;
   a three-phase inverter coupled downstream from the DC-link and configured to generate a two-phase AC output voltage to drive the motor, said three-phase inverter comprising:
      a first phase output coupled to a main winding of the motor;
      a second phase output coupled to the main winding and a start winding of the motor; and a third phase output coupled to a capacitor that is coupled to the start winding; and a controller configured to:
operate a switch device configured to bypass a capacitor of the motor when a motor commanded frequency is not within a predetermined range of line input power frequencies; and synchronize two phases of the three-phase inverter to apply an output voltage to the motor that is substantially equivalent to line input voltage when the motor commanded frequency is within the predetermined range of line input power frequencies.

14. The motor drive circuit of claim 13, wherein:
the first phase output is coupled to a first side of the main winding;
the second phase output is coupled to a second side of the main winding and a first side of the start winding; and
the third phase output is coupled to the capacitor that is series-coupled to a second side of the start winding.

15. The motor drive circuit of claim 13, wherein the controller is further configured to implement two-phase switching for variable speed control of the motor.

16. The motor drive circuit of claim 13, wherein the controller is further configured to synchronize the three-phase inverter output to operate at substantially twice the frequency of the line input power.

17. A motor drive circuit configured to drive a motor, said motor drive circuit comprising:

a bi-directional power converter configured to realize bidirectional power transfer of AC line input power received from a power source and regenerated power from the motor;

a three-phase inverter coupled downstream from the bi-directional power converter and configured to generate a two-phase AC output voltage to drive the motor, said three-phase inverter comprising:
a first phase output coupled to a main winding of the motor;
a second phase output coupled to the main winding and a start winding of the motor; and
a third phase output coupled to a capacitor that is coupled to the start winding; and a controller configured to:
synchronize multiple outputs of the inverter by providing two inverter phases with the same command; and
enable regeneration of power from the motor to the power source when instantaneous power of the motor becomes negative.

18. The motor drive circuit of claim 17, further comprising a DC link electrically coupled to the bi-directional power converter, the DC-link comprising a low-capacitance capacitor having a capacitance less than 100 µF.

19. The motor drive circuit of claim 17, wherein the controller is further configured to control active front end operation of the bi-directional power converter and two-phase synchronization of the inverter when the motor commanded frequency is within the predetermined range of line input power frequencies.

* * * * *